US012188834B2

(12) United States Patent
Goossens

(10) Patent No.: US 12,188,834 B2
(45) Date of Patent: Jan. 7, 2025

(54) TEMPERATURE MEASUREMENT SYSTEM AND METHOD OF CALIBRATION THEREOF

(71) Applicant: Dana Automotive Systems Group, LLC, Maumee, OH (US)

(72) Inventor: Stijn Goossens, Bruges (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/296,894

(22) Filed: Apr. 6, 2023

(65) Prior Publication Data

US 2023/0251143 A1    Aug. 10, 2023

Related U.S. Application Data

(62) Division of application No. 17/646,824, filed on Jan. 3, 2022, now Pat. No. 11,650,107, which is a division of application No. 16/285,593, filed on Feb. 26, 2019, now Pat. No. 11,293,811.

(51) Int. Cl.
*G01K 7/24* (2006.01)
*G01K 13/00* (2021.01)
*G01K 15/00* (2006.01)

(52) U.S. Cl.
CPC .............. *G01K 7/24* (2013.01); *G01K 13/00* (2013.01); *G01K 15/005* (2013.01)

(58) Field of Classification Search
CPC ........ G01K 7/24; G01K 13/00; G01K 15/005; G01K 2205/00
See application file for complete search history.

(56) References Cited

U.S. PATENT DOCUMENTS

| 9,909,935 | B1 | 3/2018 | Biers et al. |
| 9,915,571 | B2 | 3/2018 | Wu et al. |
| 2005/0178130 | A1* | 8/2005 | Van Gilder ............... F01P 11/16 |
| | | | 374/E15.001 |
| 2005/0225422 | A1 | 10/2005 | Seshadri et al. |
| 2006/0209921 | A1 | 9/2006 | Brown et al. |
| 2009/0016405 | A1 | 1/2009 | Kubota et al. |
| 2012/0323440 | A1 | 12/2012 | Dehart et al. |
| 2017/0192127 | A1 | 7/2017 | Kim et al. |
| 2018/0062630 | A1 | 3/2018 | Lim et al. |
| 2018/0067507 | A1 | 3/2018 | Nielsen et al. |

(Continued)

FOREIGN PATENT DOCUMENTS

| EP | 2024717 B1 | 1/2018 |
| JP | 10314527 A * | 12/1998 |
| WO | 2016164049 A1 | 10/2016 |

OTHER PUBLICATIONS

Translation of JPH10314527A (Year: 1998).*

*Primary Examiner* — Mirellys Jagan
(74) *Attorney, Agent, or Firm* — McCoy Russell LLP

(57) ABSTRACT

A temperature measurement system of a vehicle includes a controller, a first temperature sensor associated with a first location, and a second temperature sensor associated with a second location. The temperature measurement system is calibratable based upon a comparison of a temperature of the first location and a temperature of the second location, wherein the temperature of at least one of the first location and the second location is determined after a predetermined time from an end of operation of the vehicle.

10 Claims, 3 Drawing Sheets

(56) References Cited

U.S. PATENT DOCUMENTS

| | | |
|---|---|---|
| 2018/0074008 A1 | 3/2018 | Malecha |
| 2018/0076736 A1 | 3/2018 | Lu et al. |
| 2018/0076817 A1 | 3/2018 | Yamada et al. |
| 2018/0080836 A1 | 3/2018 | Rehm-Gumbel et al. |
| 2018/0272838 A1 | 9/2018 | Kaufmann et al. |
| 2020/0072682 A1 | 3/2020 | Rümler |
| 2021/0323440 A1 | 10/2021 | Cha et al. |

\* cited by examiner

TEMPERATURE MEASUREMENT SYSTEM AND METHOD OF CALIBRATION THEREOF

CROSS REFERENCE TO RELATED APPLICATIONS

The present application is a divisional of U.S. Non-Provisional patent application Ser. No. 17/646,824, entitled "TEMPERATURE MEASUREMENT SYSTEM AND METHOD OF CALIBRATION THEREOF," and filed on Jan. 3, 2022, which is a divisional of application Ser. No. 16/285,593, entitled "TEMPERATURE MEASUREMENT SYSTEM AND METHOD OF CALIBRATION THEREOF," and filed on Feb. 26, 2019. The entire contents of the above-referenced applications are hereby incorporated by reference for all purposes

TECHNICAL FIELD

The subject matter of the embodiments described herein is directed toward a temperature measurement system, and more particularly to a temperature measurement system and a method for calibration thereof.

BACKGROUND

Conventional temperature measurement systems typically include at least one temperature sensor used to measure or estimate a temperature of a desired component or system. Commonly, a temperature dependent resistor, commonly referred to as a thermistor, is employed as the temperature sensor in the temperature measurement system. Commercially available thermistors, however, typically have resistance versus temperature properties which deviate significantly from the nominal values thereof provided by the manufacturer of the thermistor. This deviation in resistance versus temperature properties can result in a substantial shift or skewing of an operation or response of the desired component or system in view of the different value of resistance measured for any given temperature. Error in the measured resistance can result in a different response from the desired component or system than is desired where the desired component or system is programmed to respond in accordance with a particular algorithm or value from a look-up table.

Where the desired component or system is assembled in mass production such as in vehicle systems, for example, a significant variation in resistance versus temperature properties of the commercially available thermistors can result in a prohibitively wide variation in the response of the vehicle system or, in a worst-case scenario, the vehicle system becoming completely dysfunctional. Ideally, a calibration of each and every thermistor within the temperature measurement system would occur as a final step in the manufacture of the vehicle system to obtain highly accurate temperature sensing. However, such calibration would be extremely expensive and require complex logistics.

Accordingly, it would be desirable to develop a temperature measurement system and a method of calibration thereof which improves accuracy of the temperature measurement system while minimizing cost and complexity.

SUMMARY

In concordance and agreement with the present disclosure, a temperature measurement system and a method of calibration thereof which improves accuracy of the temperature measurement system while minimizing cost and complexity, has surprisingly been discovered.

In an embodiment, a temperature measurement system of a vehicle, comprises: a controller in electrical communication with at least one temperature sensor, wherein the temperature measurement system is calibratable based upon a comparison of a plurality of temperatures at least one of measured and estimated by the at least one temperature sensor after a predetermined time.

In another embodiment, a temperature measurement system of a vehicle, comprises: a controller in electrical communication with a memory for storing data; a first temperature sensor in electrical communication with the controller, wherein the first temperature sensor is configured to transmit a measured voltage difference representative of a temperature of a first location to the controller; and a second temperature sensor in electrical communication with the controller, wherein the second temperature sensor is configured to transmit a temperature of a second location to the controller, wherein the controller is configured to determine the temperature of the first location from the measured voltage difference using a determination method which is calibratable based upon a comparison of the temperature of the first location to the temperature of the second location.

In yet another embodiment, a method of temperature measurement system calibration, the method comprises the steps of: providing a temperature measurement system including a controller, a memory for storing data, a first temperature sensor, and a second temperature sensor, wherein the controller is in electrical communication with the memory for storing data, the first temperature sensor, and the second temperature sensor; and calibrating the temperature measurement system based upon a comparison of a temperature of a first location and a temperature of a second location, wherein the temperature of at least one of the first location and the second location is determined after a predetermined time.

As aspects of certain embodiments, at least one of the temperatures is at least one of measured and estimated by the at least one temperature sensor after a predetermined time from an end of operation of the vehicle.

As aspects of certain embodiments, the at least one temperature sensor at least one of measures and estimates a temperature of a desired location.

As aspects of certain embodiments, the at least one temperature sensor at least one of measures and estimates a temperature of an input location.

As aspects of certain embodiments, the determination method of the temperature measurement system determines the temperature of the first location based upon at least one of a tolerance band and a function stored in the memory for storing data and the measured voltage difference transmitted by the first temperature sensor.

As aspects of certain embodiments, the determination method of the temperature measurement system determines the temperature of the first location based upon a look-up table stored in the memory for storing data and the measured voltage difference transmitted by the first temperature sensor.

As aspects of certain embodiments, the first temperature sensor is a thermistor configured to transmit a measured voltage difference to the controller.

As aspects of certain embodiments, the first location is one of a component and fluid of the vehicle of which a direct temperature measurement is unobtainable by the first temperature sensor.

As aspects of certain embodiments, the second location is one of a component and fluid of the vehicle of which a direct temperature measurement is obtainable by the second temperature sensor.

As aspects of certain embodiments, the method further comprises the step of: determining the temperature of the first location based upon at least one of a tolerance band and a function stored in the memory for storing data and the measured voltage difference transmitted by the first temperature sensor.

As aspects of certain embodiments, the method further comprises the step of: determining the temperature of the first location based upon a look-up table stored in the memory for storing data and the measured voltage difference transmitted by the first temperature sensor.

As aspects of certain embodiments, the step of calibrating the temperature measurement system based upon a comparison of a temperature of a first location and a temperature of a second location includes calibrating a determination method from which the temperature of the first location is determined.

BRIEF DESCRIPTION OF THE DRAWINGS

The above, as well as other advantages of the present embodiments, will become readily apparent to those skilled in the art from the following detailed description when considered in the light of the accompanying drawings in which.

DETAILED DESCRIPTION

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in herein. Hence, specific dimensions, directions or other physical characteristics relating to the embodiments disclosed are not to be considered as limiting.

Figure 1:
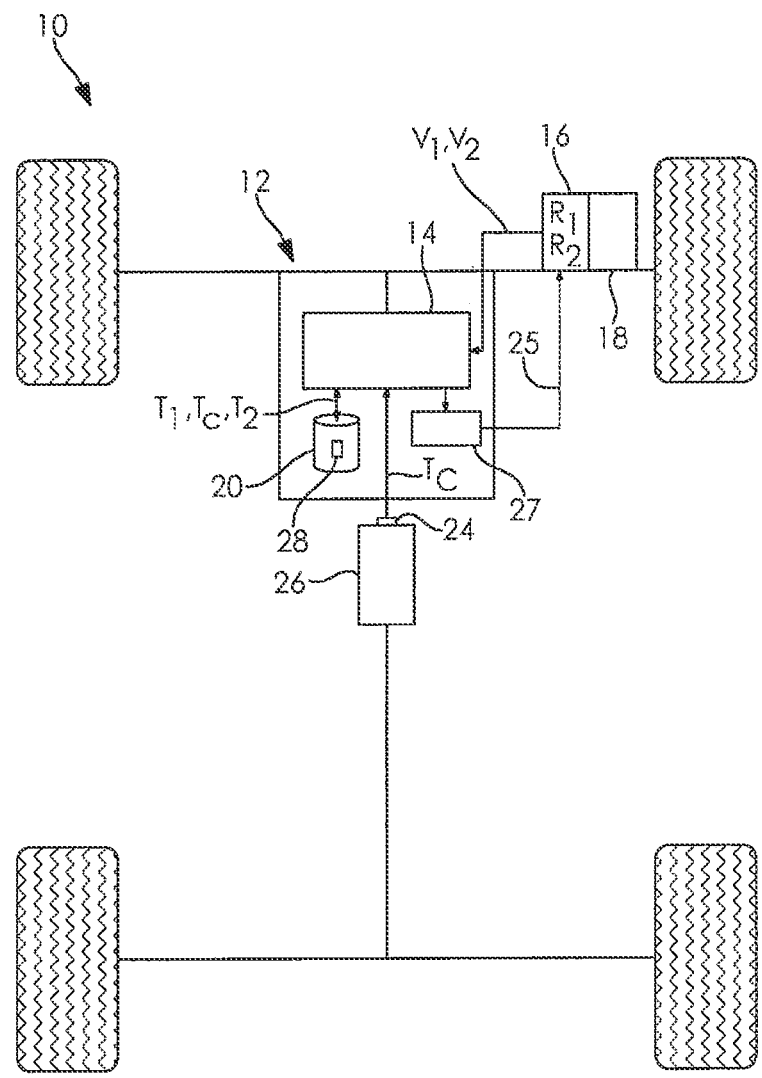
FIG. 1 is a graphical representation of a vehicle including a temperature measurement system according to an embodiment of the present subject matter.

FIG. 1 depicts a vehicle 10 according to an embodiment of the present subject matter. The vehicle 10 may be any vehicle type as desired such as a conventional fuel-powered vehicle, an electric vehicle, and an electric-hybrid vehicle, for example. The vehicle 10 includes a temperature measurement system 12. In certain embodiments, the temperature measurement system 12 includes a controller or microcontroller 14, a first temperature sensor 16 for measuring and/or estimating a temperature $T_1$ of a desired location 18 (e.g. a component or fluid of the vehicle 10 which is impossible or impracticable to obtain a direct temperature measurement), a memory 20 for storing data, and a second temperature sensor 24 for measuring a temperature $T_2$ of an input location 26 (e.g. a component or fluid of the vehicle 10). It is understood that additional temperature sensors 24 may be employed for measuring temperatures at a plurality of input locations 26. More particularly, the desired location 18 may be a clutch assembly of a rear drive unit, differential gear assembly, and the like, for example. Further, the input location 26 may be a vehicle engine, an engine fluid, a vehicle transmission, a transmission fluid, ambient air, and the like, for example.

The temperature measurement system 12 is configured to allow various components, modules, systems, and applications of the vehicle 10 to communicate with each other. Various types of controllers or microcontrollers 14 may be employed in the vehicle 10 such as a controller area network (CAN) system, for example. In the embodiment shown, the controller 14 is electrically connected to at least one of the first temperature sensor 16, the memory 20, and the second temperature sensor 24 of the temperature measurement system 12 to allow communication thereamong.

In one embodiment, the first temperature sensor 16 is thermistor. Various types of thermistors may be employed as the first temperature sensor 16 such as a negative temperature coefficient (NTC) thermistor and a positive temperature coefficient (PTC) thermistor, for example. With an NTC thermistor, when the temperature increases, resistance of the NTC thermistor decreases. Conversely, when temperature decreases, resistance of the NTC thermistor increases. On the other hand with a PTC thermistor, when temperature increases, the resistance of the PTC thermistor increases, and when temperature decreases, resistance of the PTC thermistor decreases.

Unlike other temperature sensors, the first temperature sensor 16 is a nonlinear thermistor, meaning a relationship between a resistance and a temperature is not a 1:1 ratio. As such, the temperature to resistance values plotted on a graph representing such relationship form a curve rather than a straight line. It is understood that the first temperature sensor 16 may have a variety of shapes and sizes such as a disk, chip, bead, rod, surface-mounted, for example. The first temperature sensor 16 can also be encapsulated in epoxy resin, glass, baked-on phenolic, and painted, if desired.

In the embodiment shown, the first temperature sensor 16 is employed to at least one of measure and estimate the temperature $T_1$ of the desired location 18. The first temperature sensor 16 has a minimal amount of electrical current 25 (also commonly referred to as a bias current) flowing therethrough. The controller 14 is configured to cause an electrical source 27 to transmit the electrical current 25 to the first temperature sensor 16. The first temperature sensor 16 has a resistance $R_1$ associated with the temperature $T_1$ of the desired location 18. The electrical current 25 flowing through the first temperature sensor 16 converts the resistance $R_1$ of the first temperature sensor 16 to a measured voltage difference $V_1$ across terminals of the first temperature sensor 16. The measured voltage difference $V_1$ is then transmitted from the first temperature sensor 16 to the controller 14. In certain embodiments, the controller 14 determines a temperature $T_1$ of the desired location 18 based upon at least one determination method such as using the measured voltage difference $V_1$ and a tolerance band or function of the first temperature sensor 16 stored within the memory 20 of the temperature measurement system 12, for example. The first temperature sensor 16 is initially configured to operate within a certain tolerance band or function. A relationship between voltage and resistance is known, and may be calculated by utilizing a look-up table 28, or other mathematical relationship therebetween. As such, in certain other embodiments, the determination method of the controller 14 utilizes the look-up table 28 stored in the memory 20 to determine the temperature $T_1$ of the desired location 18 based upon the measured voltage difference $V_1$ of the first temperature sensor 16.

To improve accuracy of measuring or estimating the temperature $T_1$ of the desired location, the determination method of the temperature measurement system 12, from which the temperature $T_1$ is determined, is calibratable. In certain embodiments, the determination method, using the tolerance band or function of the first temperature sensor 16 stored within the memory 20 of the temperature measurement system 12 or look-up table 28, is calibratable based upon thermal dynamics of the vehicle 10.

Figure 2:
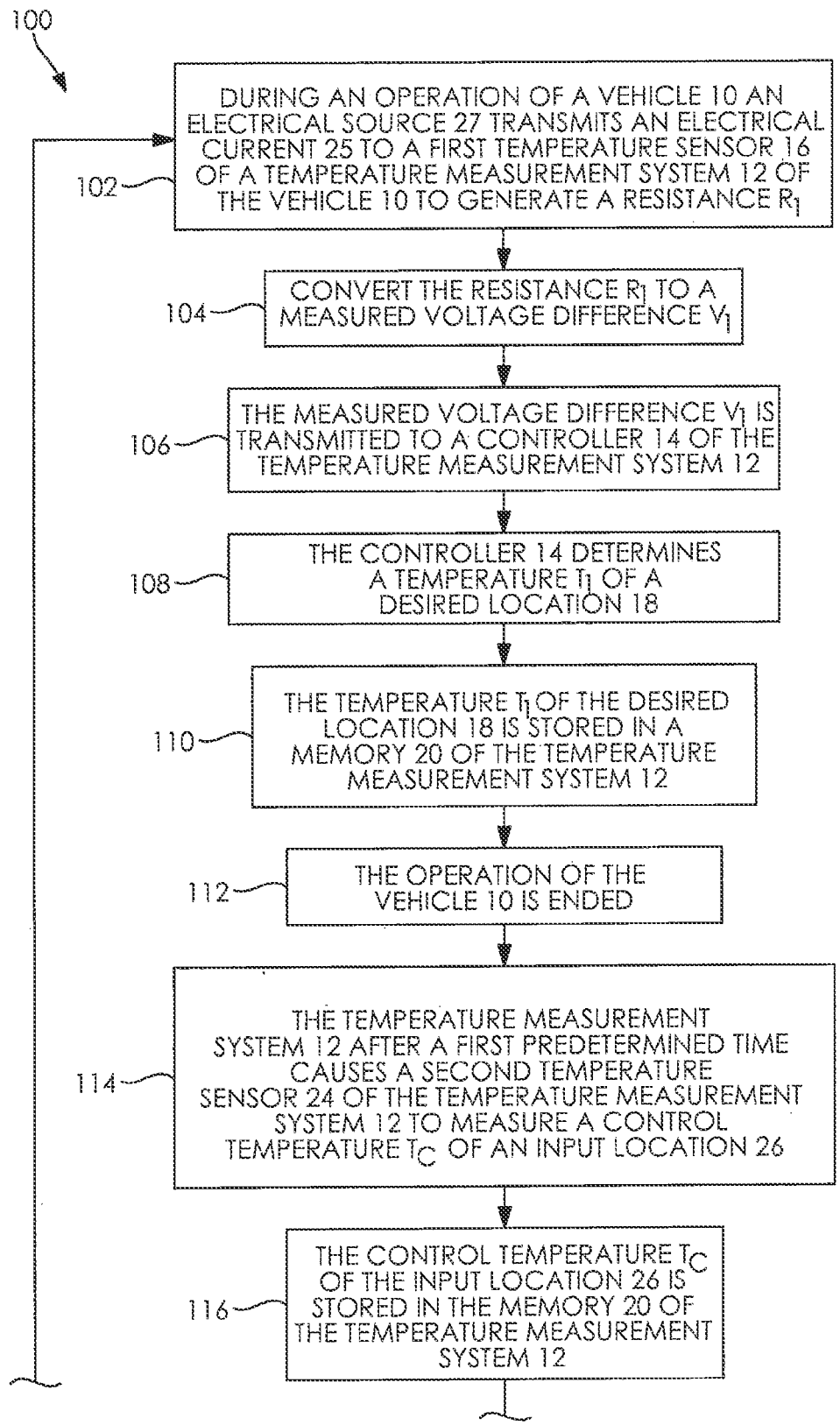
FIG. 2 is a schematic flow diagram of a method for calibration of the temperature measurement system shown in FIG. 1 according to an embodiment of the subject disclosure.
Figure 2:
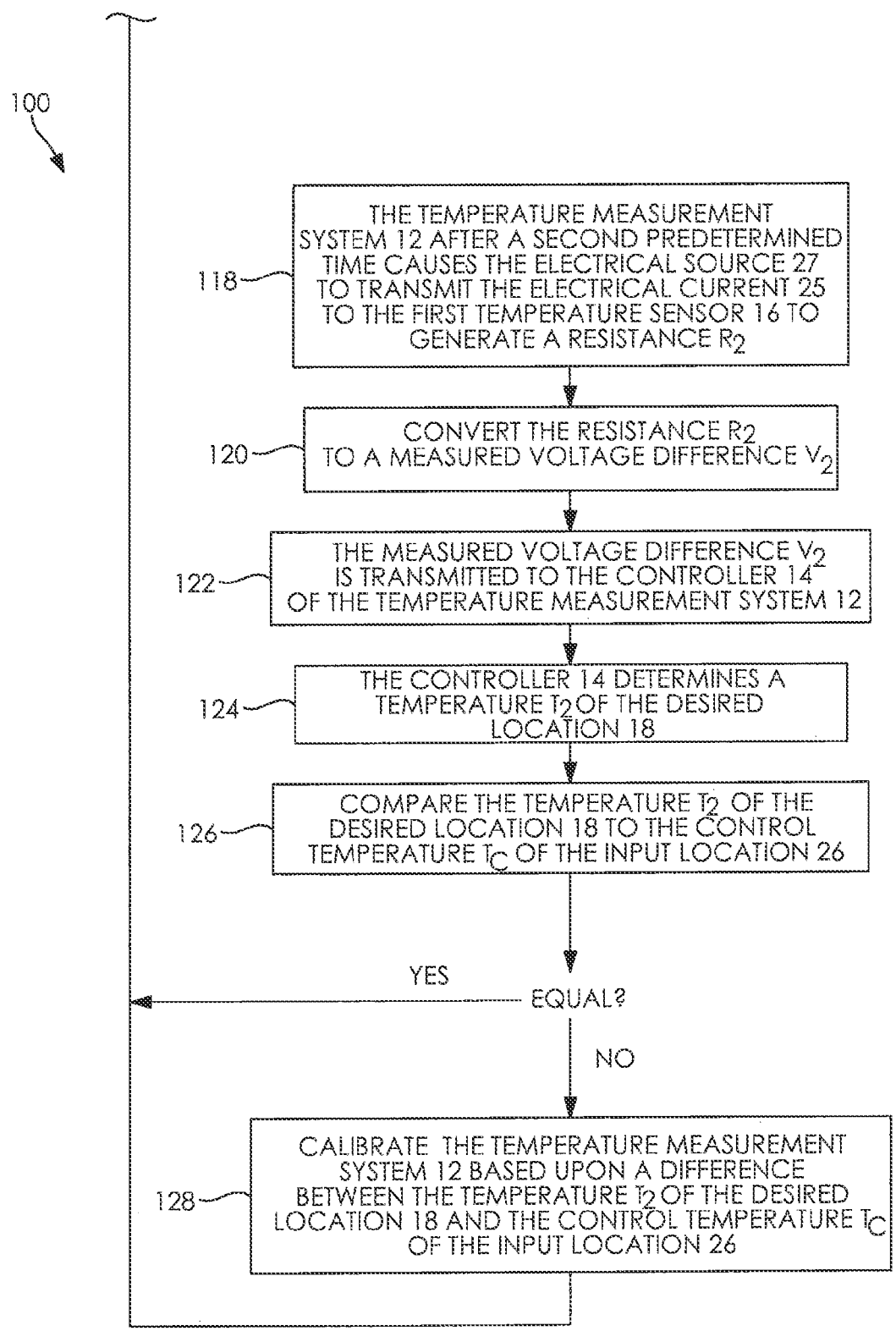

Referring now to FIG. 2, a flow diagram showing a method of calibration 100 for the temperature measurement system 12. At step 102, the temperature measurement system 12, during an operation of the vehicle 10, causes the electrical source 27 to transmit the electrical current 25 to the first temperature sensor 16 and flow therethrough, which generates the resistance $R_1$. At step 104, the resistance $R_1$ of the first temperature sensor 16 is then converted to the measured voltage difference $V_1$ across the terminals of the first temperature sensor 16 representative of the temperature $T_1$ of the desired location 18. At step 106, the measured voltage difference $V_1$ is then transmitted to the controller 14 of the temperature measurement system 12. At step 108, the controller 14, using the determination method, determines the temperature $T_1$ of the desired location 18. In one embodiment, the temperature $T_1$ of the desired location 18 is based upon the tolerance band or function of the measured voltage difference $V_1$ of the first temperature sensor 16. In certain other embodiments, the temperature measurement system 12 utilizes the lookup table 28 stored in the memory 20 to determine the temperature $T_1$ of the desired location 18 based upon the measured voltage difference $V_1$ of the first temperature sensor 16. At step 110, the temperature $T_1$ of the desired location 18 is stored in the memory 20 of the temperature measurement system 12.

At step 112, an operation of the vehicle 10 is ended. At step 114, the temperature measurement system 12, after a first predetermined time from an end of the operation of the vehicle 10, causes the second temperature sensor 24 to measure a control temperature $T_c$ of the input location 26. At step 116, the control temperature $T_c$ of the input location 26 is stored in the memory 20 of the temperature measurement system 12. At step 118, the temperature measurement system 12, after a second predetermined time from the end of the operation of the vehicle 10, causes the electrical source 27 to transmit the electrical current 25 to the first temperature sensor 16 and flow therethrough. It should be appreciated that the steps to measure the control temperature $T_c$ of the input location 26 and the steps to determine the temperature $T_2$ of the desired location 18 may be conducted substantially simultaneously, chronologically, or vice versa, by the temperature measurement system 12, as desired. In one example, each of the first and second predetermined times from the end of the operation of the vehicle 10 is of such a length of time to allow convergence of temperatures over an entirety of the vehicle 10, in other words, to allow the vehicle 10 to reach a steady state. In another example, at least one of the first and second predetermined times from the end of the operation of the vehicle 10 is longer than 4-5× a longest time constant of the vehicle 10. It is understood, however, that each of the first and second predetermined times can be any length of time, as desired. It is further understood that the first and second predetermined times may be substantially the same, the first predetermined time may be shorter than the second predetermined time, or the first predetermined time may be longer than the second predetermined time.

The first temperature sensor 16 has a resistance $R_2$ associated with a temperature $T_2$ of the desired location 18. At step 120, the resistance $R_2$ is then converted to a measured voltage difference $V_2$ across the terminals of the first temperature sensor 16 representative of the temperature $T_2$ of the desired location 18. At step 122, the measured voltage difference $V_2$ is then transmitted to the controller 14 of the temperature measurement system 12. At step 124, the controller 14, using the determination method, determines the temperature $T_2$ of the desired location 18 based upon the tolerance band and/or function of the measured voltage difference $V_2$ of the first temperature sensor 16, or by utilizing the look-up table 28, or other mathematical relationship therebetween.

At step 126, the temperature $T_2$ of the desired location 18 is then compared to the control temperature $T_c$ of the input location 26. When the temperature $T_2$ of the desired location 18 is not substantially equal to the control temperature $T_c$ of the input location 26, the determination method of the temperature measurement system 12 is calibrated at step 128. It should be appreciated that the temperature $T_2$ of the desired location 18 may be permitted to differ from the control temperature $T_c$ of the input location 26 by a certain amount or percentage without requiring a calibration of the temperature measurement system 12.

More particularly, at step 128, the determination method using the tolerance band and/or function of the measured voltage difference $V_1$, or look-up table 28, or other mathematical relationship therebetween, is calibrated so that the temperature $T_2$ of the desired location 18 determined therefrom would be substantially equal to the control temperature $T_c$ of the input location 26. In one embodiment, the controller 14, based upon the difference between $T_2$ and $T_c$, updates which tolerance band or function of the first temperature sensor 16 is utilized by the determination method to determine or calculate the temperature $T_2$ of the desired location 18 when the measured voltage difference is received from the first temperature sensor 16. In another embodiment, the controller 14, based upon the difference between $T_2$ and $T_c$, updates which look-up table 28 is utilized by the determination method to determine or calculate the temperature $T_2$ of the desired location 18 when the measured voltage difference is received from the first temperature sensor 16. Accordingly, the control temperature $T_c$ of the input location 26 when the vehicle 10 has reached steady state is a baseline utilized to adjust and calibrate the determination method from which the temperature $T_2$ of the desired location 18 is determined, thereby minimizing error and improving an accuracy of the temperature measurement system 12.

It should be appreciated that any number of tolerance bands, functions and look-up tables may be employed and stored within the memory 20 of the temperature measurement system 12. It should also be appreciated that the temperature measurement system 12 may only employ a single tolerance band, function, or look-up table, which is continuously calibrated and stored within the memory 20.

In accordance with the provisions of the patent statutes, the present subject matter has been described in what is considered to represent its preferred embodiments. However, it should be noted that the subject matter can be practiced otherwise than as specifically illustrated and described without departing from its spirit or scope.

The invention claimed is:

1. A temperature measurement system of a vehicle, comprising:
a controller in electrical communication with a thermistor and a control temperature sensor and configured to calibrate the temperature measurement system in response to a first temperature and a second temperature being substantially unequal;
wherein the first temperature is determined based on a first-resistance that is generated by the thermistor during vehicle operation;
wherein the resistance is generated by the thermistor in response to an electrical source transmitting an electrical current to the thermistor;
wherein the controller commands the electrical source to transmit the electrical current;
wherein the second temperature is transmitted to the controller by the control temperature sensor; and
wherein the first temperature and the second temperature are determined at different times.

2. The temperature measurement system according to claim 1, wherein the second temperature is determined at a predetermined time from an end of operation of the vehicle.

3. The temperature measurement system according to claim 1, wherein the first temperature that is determined by the thermistor is the temperature of a clutch assembly of the vehicle.

4. The temperature measurement system according to claim 1, wherein the second temperature is transmitted to the controller by the control temperature sensor after an end of vehicle operation.

5. The temperature measurement system according to claim 1, wherein the thermistor is a negative temperature coefficient thermistor.

6. The temperature measurement system according to claim 1, wherein the thermistor is a positive temperature coefficient thermistor.

7. The temperature measurement system according to claim 1, wherein the first temperature is determined based on a tolerance band of the thermistor.

8. The temperature measurement system according to claim 1, wherein the second temperature is a temperature at an input location of the vehicle.

9. The temperature measurement system according to claim 8, wherein the input location is an engine of the vehicle.

10. The temperature measurement system according to claim 8, wherein the input location is a transmission of the vehicle.

* * * * *